(12) United States Patent
Hawkes et al.

(10) Patent No.: US 7,734,454 B2
(45) Date of Patent: Jun. 8, 2010

(54) SIMULATION AT TWO DIFFERENT LEVELS OF COMPLEXITY

(75) Inventors: Rycharde Jeffery Hawkes, Bristol (GB); David Trevor Cliff, Southville (GB); Colin Andrew Low, Wotton-Under-Edge (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1733 days.

(21) Appl. No.: 10/695,549

(22) Filed: Oct. 28, 2003

(65) Prior Publication Data

US 2004/0220793 A1 Nov. 4, 2004

(30) Foreign Application Priority Data

Apr. 30, 2003 (GB) ................................ 0309958.7

(51) Int. Cl.
*G06G 7/48* (2006.01)
*G06G 7/58* (2006.01)
*G06T 13/00* (2006.01)
*G06F 17/30* (2006.01)
*G06F 17/00* (2006.01)
*G06F 9/44* (2006.01)

(52) U.S. Cl. .............................. 703/6; 703/11; 345/473; 707/203; 715/229; 717/122; 717/170

(58) Field of Classification Search ............ 703/6, 703/11, 13; 345/473; 707/203; 715/229; 717/122, 170

See application file for complete search history.

(56) References Cited

U.S. PATENT DOCUMENTS

| | | | | |
|---|---|---|---|---|
| 5,592,402 | A * | 1/1997 | Beebe et al. | 703/6 |
| 5,623,428 | A * | 4/1997 | Kunii et al. | 703/6 |
| 5,678,013 | A * | 10/1997 | Smith et al. | 715/866 |
| 6,285,380 | B1 * | 9/2001 | Perlin et al. | 345/473 |
| 6,446,055 | B1 * | 9/2002 | Grand | 706/10 |
| 2002/0128746 | A1 | 9/2002 | Boies et al. | |

FOREIGN PATENT DOCUMENTS

EP 871137 A1 * 10/1998

OTHER PUBLICATIONS

Guillot et al., "Computer Simulations of Adaptive Behavior in Animals" 1994, IEEE, p. 122-131.*

DeMarse et al., "The Neurally Controlled Animat: Biological Brains Action with Simulated Bodies" Nov. 2001 Computer Science and Engineering vol. 11 Abstract, p. 1-3.*

Atsumi-M., "Artificial Neural Development for Pulsed Neural Network Design—A Simulation Experiment on Animat's Cognitive Map Genesis". 2000 IEEE p. 188-198.*

(Continued)

*Primary Examiner*—Ramesh B Patel
*Assistant Examiner*—Thomas H Stevens

(57) ABSTRACT

A technique for consistently simulating at two different complexities of simulation is described. This technique is particularly relevant to simulation of a creature-like autonomous agent (biological or artificial or hybrid). The model, in the particular case a model of the creature, comprises at least two portions. The first portion contains functions used in both of the different complexities of simulation. The second portion comprises two alternative versions, a first version for use in one complexity of simulation, and a second version for use in the other complexity of simulation.

10 Claims, 3 Drawing Sheets

OTHER PUBLICATIONS

Terzopoulos-D., "Artificial Life for Computer Graphics" ACM 1999 p. 33-43.*

Sander-M.J., "Evolving Locomotion Controllers for Virtual Creatures", Univ. of Auckland Feb. 2000 p. 1-76.*

"Videre: Journal of Computer Vision Research" MIT Press 1997 p. 1-20.*

French et al., "The Hi-Noon Neural Simulator and its Applications to Animal, Animat and Humanoid Studies" Microelectronics Reliability 2001 p. 2051-2065.*

Aube et al., "What Are Emotions For? Commitments Management and Regulation Within Animals/Animats Encounters" 1996 MIT Press.*

Werner-G.M., "Using Second Order Neural Connections for Motivation of Behavioral Choices", 1994, Computer Science Dept., UCLA, pp. 154-161.*

Blumberg-B.M., "Multi-Level Direction of Autonomous Creatures for Real-Time Virtual Environments" ACM 1995 p. 47-54.*

Guillot et al.,"The Animat Contribution to Cognitive System Research" AnimatLab, 2001. p. 157-165.*

Meyer et al., "From SAB90 to SAB94: Four years of Animat Research" Internation Confer of Adaptive Behavior 1994, p. 8-12.*

Sims-K., "Evolving Virtual Creatures" International Confer and Interactive Techniques 1994 p. 15-22.*

Atkeson et al., "Using Humanoid Robots to Study Human Behavior" IEEE 2000 p. 46-55.*

Funge-J., "Cognitive Modeling for Games and Animation" ACM 2000 p. 40-48.*

(Internet Page) [4-22] Animats and Autonomous Agents, URL: http://www.faqs.org/faqs/ai-faq/general/part4/section-23.html, p. 1-2.

(Conference Paper) "No Bad Dogs: Ethological Lessons for Learning in Hamsterdam", Blumber B. M., Todd, P., M., Maes. From Animals to Animats, Proceedings of the Fourth International Conference on the Simulation of Adaptive Behavior. Cambridge, MA: MIT Press http://characters.media.mit.edu/Papers/sab96.pdf, p. 1-10.

(Thesis) "Old Tricks, New Dogs: Ethology and Interactive Creatures" Bruce Mitchell Blumberg., http://web.media.mit.edu/ bruce/Site01.data/tricks.pdf, p. 1-146.

(Proceedings Paper) "Multi-Level Direction of Autonomous Creatures for Real-Time Virtual Environments", Blumberg B. M., Galyean T. A., pp. 47-54, Computer Graphics Proceedings, Annual Conference Series, 1995. http://web.media.mit.edu/ bruce/Site01.data/siggraph95.pdf.

(Proceedings Paper) "A Layered Brain Architecture for Synthetic Creatures", Isla D., Burke R., Downie M., Blumberg B., Proceedings of IJCAI, Seattle, WA, Aug. 2001. http://characters.media.mit.edu/Papers/ijcai01.pdf, p. 1-8.

(Proceedings Paper) "Using an Ethologically-Inspried Model to Learn Apparent Temporal Causality for Planning in Synthetic Creatures", Burke R., Blumberg B., Proceedings of the First International Joint conference on Autonomous Agents and Multiagent Systems, AAMAS 2002. http://web.media.mit.edu/ bruce/Site01.data/aa02-burke.pdf, p. 1-9.

(Trinity Colelge Dublin ISG paper) "ALOHA: Adaptive Level of Detail for Human Animation, Towards a New Framework", Giang T., Mooney R., Peters C., O'Sullivan C. http://isg.cs.tcd.ie/petersc/pubs/aloha.pdf, p. 1-7.

* cited by examiner

SIMULATION AT TWO DIFFERENT LEVELS OF COMPLEXITY

FIELD OF THE INVENTION

The present invention relates to improvements in simulation. It is particularly applicable to the simulation of creatures for use in two different complexities of simulation.

BACKGROUND OF THE INVENTION

As will be indicated later, although the present invention has broader application, it arose in connection with the simulation of creatures. This area of art will now be discussed.

One of the problems with studying life sciences is that changes in ecosystems and the evolution of life forms takes place over long periods of time. Consequently, life processes have been simulated in a variety of formats, thus allowing the study of the interaction of creatures and the emerging population patterns.

An animat is an artificial creature which exhibits an active and purposeful behavior in an environment which presents it with problems—obstacles, navigation, hazards, goals. Animats are often inspired by biological organisms, which are observed to solve complex problems in real physical environments. Indeed, animats may be designed to be as close as possible to the original biological organisms, so as to model the potential behavior and/or evolution of such organisms.

It will be understood that use of the word "animat" is intended to mean not only artificial creatures that are directly inspired by real biological creatures, but also imaginary animals and other autonomous agents such as real or imagined robots or "cyborgs" (part animal, part machine).

In order to make such simulations as accurate as possible, it is desirable to lavish as much computational resource on each artificial creature as is available. The method of simulating an animat depends on the available computational resources. If a significant amount of processing power is available, it is possible to perform a high-fidelity simulation (Hi-Fi Sim). Such a high-fidelity simulation will include the use of computationally expensive techniques for behavior selection, sensing and interaction with the environment and other animats, e.g. use of a form of 3D rigid-body physics simulation to model the environment and the various parts of the body of the animat; use of ray-tracing computer graphics to synthesize visual sensory input; the simulation of the transmission, absorption, and reflection of sound waves, etc.

If only a relatively small amount of computational power is available, then a relatively low-fidelity simulation (Lo-Fi Sim) would be utilized to ensure that the simulation progresses at a reasonable rate. Such a Lo-Fi Sim will use computationally less expensive techniques, such as only using a two dimensional (2D) model of the environment, and employing a simplified model of the body of the animat e.g. treating it as a point mass with redetermined locomotion characteristics (speed, rate of turn etc).

It is desirable that any predetermined type of animat will function in a consistent manner regardless of the level of simulation.

SUMMARY OF THE INVENTION

In a first aspect, the present invention provides a method of simulating a process for use in two different complexities of simulation, the method comprising utilizing a model of the process that comprises at least two portions, a first portion which contains functions for use in both of said different complexities of simulation; and a second portion comprising two alternative versions, a first version for use in one of said different complexities of simulation, and a second version for use in the other of said different complexities of simulation.

In a further aspect, the invention provides a method of simulating a process at two different levels of complexity, the method comprising utilizing a model that comprises at least two portions, a first portion which contains functions for use in both of said different complexities of simulation; and a second portion comprising two alternative versions, a first version for use in one of said different complexities of simulation, and a second version for use in the other of said different complexities of simulation.

It is thus appreciated that the present invention has broader application than to the simulation of creatures.

BRIEF DESCRIPTION OF DRAWINGS

For a better understanding of the invention, and to show how embodiments of the same may be carried into effect, reference will now be made, by way of example, to the accompanying diagrammatic drawings in which.

DETAILED DESCRIPTION OF EMBODIMENTS OF THE INVENTION

Figure 1:
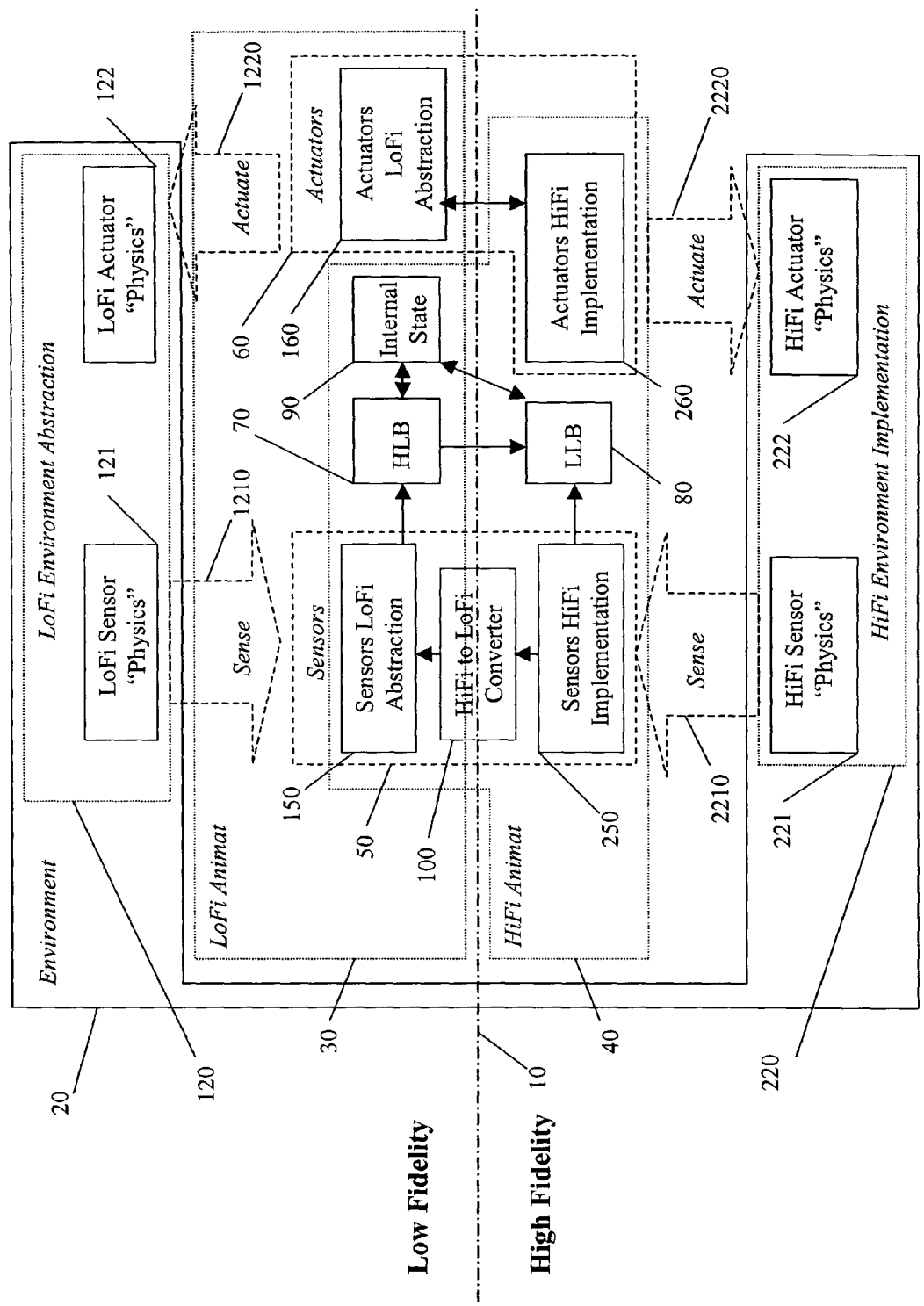
FIG. 1 shows a block diagram illustrating the simulation components that are independent of, and the components that are specific to, the different complexities of simulation, according to a preferred embodiment of the present invention.

Firstly, a preferred embodiment of the invention for use in the simulation of creatures will be described. After this, a further, generic, embodiment of the invention will be discussed, together with its application to simulation problems.

In the preferred embodiment of the present invention, a single computational resource is utilized to simulate a relatively large animat population (e.g. 100,000's) in a Lo-Fi Sim, with an associated Hi-Fi Sim acting as a slave program to the Lo-Fi Sim.

The nature of the computational resource will not be discussed in detail here, as conventional computational resources can be employed, as will be well understood by the skilled person. Any computational system with appropriate processor, memory and (where required) means of receiving instructions and displaying or otherwise outputting data can be provided. Simultaneous simulation of a large number of entities is a computationally intense task, so real time simulation, for example, is likely to require reasonably high computational performance. As will be understood, however, aspects of the present invention allow for most effective use of whatever computational resource is available for conducting the simulation.

The Hi-Fi Sim is engaged by the Lo-Fi Sim when a more detailed simulation of the activities of one or more animats is required e.g. when an animat from that population is selected for closer inspection by a user, or alternatively when an animat requires more detailed simulation. For example, this could occur when the animat encounters another animat and/or undergoes a change in its environment (e.g. encounters water or food) that could lead to an observable change in the behavior of the animat.

It is desirable that there should be a high correspondence between the detailed model of the Hi-Fi Sim and more abstract representations used in the Lo-Fi Sim. For instance, it would clearly be undesirable if the Lo-Fi sim were to simulate a particular animat as being attracted to another animat, whilst in the same situation the Hi-Fi Sim were to simulate the particular animat as being repulsed by this further animat. As the Hi-Fi Sim would be utilized to model the detailed interaction of these two animats, then this would lead to a cyclic behavior, with the Lo-Fi Sim invoking the Hi-Fi Sim when the animats are close enough to interact, the Hi-Fi Sim then indicating that the animats would repulse each other, the Lo-Fi Sim indicating the animats would attract each other and invoking the Hi-Fi Sim again etc.

To overcome such problems, in the preferred embodiment the brain of each animat is separated into two parts: a high-level brain (HLB) and a low-level brain (LLB).

The HLB is a behavior selection mechanism, that is arranged to use external (sensory) events and situations, as well as internal (e.g. simulated bio-chemical and energetic reaction levels) events and situations to decide what behavior is appropriate at any given time. The HLB of an animat is used in both the Hi-Fi Sim and the Lo-Fi Sim. The internal operation of the HLB is identical in both simulations.

Different LLB's are designed for the Hi-Fi Sim and the Lo-Fi Sim. The LLB is capable of executing the currently selected HLB behavior. In this particular embodiment, the Hi-Fi Sim LLB uses more computationally expensive techniques to execute the HLB behavior. The Lo-Fi Sim LLB uses cheaper techniques that are designed to approximate the effect of the Hi-Fi Sim LLB as close as possible.

For example, the Hi-Fi Sim in this embodiment is arranged to use a form of three dimensional (3D) modeled environment, including 3D physical simulations of each animat. The Hi-Fi Sim LLB is consequently arranged to use neural networks to control the articulation of the limbs of the body of the animat, with the interaction of limbs with the environment being modeled using rigid-body dynamics for physical simulation.

On the other hand, the Lo-Fi Sim has only a 2D (two dimensional) model of the environment, with the corresponding LLB simply using a parameterized model of the Hi-Fi Sim locomotion to approximate the movement. For instance, the LLB treats the body of the animal as a point mass with predetermined parameters such as speed, rate of turn etc.

By separating the model of the animat into two portions, it is possible to ensure consistent animat behavior in both Hi-Fi Sim and Lo-Fi Sim, while using the most appropriate techniques within each mode of simulation as required FIG. 1 shows the components of the simulation that are specific to the Hi-Fi Sim ("High Fidelity") and the Lo-Fi Sim ("Low Fidelity"). The dotted line 10 denotes the boundary between the simulation independent and the simulation specific components.

As can be seen, in the preferred embodiment the environment 20 is split into two portions, the LoFi environment abstraction 120 and the HiFi environment implementation 220. There are correspondingly two representations of an animat: the LoFi Animat 30 and the HiFi Animat 40.

In both representations there are sensors 50 and actuators 60. In the LoFi representation the sensors are modeled by a computationally inexpensive abstraction 150 and the actuators are modeled by a similarly simplified abstraction 160. In the HiFi representation the sensors are implemented using an accurate and realistic (but computationally expensive) implementation 250 and similarly the actuators are implemented using an accurate and realistic (but computationally expensive) implementation 260.

The sensors and actuators each require an appropriate representation of the simulated environment, and so in the LoFi Sim the process 1210 of computing what the animat senses in the environment 20 is achieved by use of an abstract representation of the physics of sensing 121. Similarly the process 1220 of effecting the changes in the animat's relationship to its environment 20 as a consequence of its current actuator settings 160 is achieved by use of an appropriate abstract representation of the physics of actuation 122.

In an analogous fashion for an instance of a HiFi Sim animat, the process 2210 of determining what the animat senses relies on the HiFi Sim sensors 250 having available a high fidelity implementation of the relevant sensor-physics 221. Similarly the process 2220 of determining the effects of the HiFi Sim actuators 260 requires a high-fidelity model of the physics of actuation 222 in the environment 20.

It should be understood that the word "physics" is used here to refer to the nature of the environment's "laws of physics" and can refer both to simulations of physics systems similar to those familiar from common knowledge of the laws of physics in the real known universe, and also to fictional and imaginary physics systems unlike those known to exist in the real universe. An example of an imaginary physics system is the "laws of physics" of many humorous animated cartoons, where an animated character that runs at high speed off the edge of a cliff will typically continue to run horizontally through the air until it notices that it is in mid-air, at which point it ceases to travel horizontally and instead starts to fall vertically downwards.

Referring again to FIG. 1, in an example of the preferred embodiment of the invention the intended application may be a computational simulation of wild animals on the African plains. For each species of animal that is simulated, there will be a LoFi Sim representation and a corresponding HiFi Sim representation.

In this example animats are either simulated antelope or simulated lions. Each individual animal in the simulation will have its own LoFi Animat representation 30 that is computationally inexpensive to calculate updates for and that requires comparatively little storage space (RAM-space or disk-space). A HiFi Animat representation of an individual animal will only be created when necessary for the purposes of the simulation, e.g. when the creature fights or pursues a prey or evades a predator.

In this example of the preferred embodiment, there may be many thousands of simulated antelopes, and many hundreds of lions, each of which is represented in the LoFi Environment 120 as a point with co-ordinates (x,y) on a 2-dimensional (2-d) plane. The LoFi Actuators 160 may simply apply a 2-d vector to the animat's co-ordinates, updating its position. The vector's direction and magnitude would vary as the animat runs, eats, or sleeps. The antelope-animat's LoFi sensors 150 may simply examine the LoFi Sensor Physics representation of the environment 121 to determine the distance and direction of the nearest food source, the nearest water source, the nearest other antelope and the nearest lion. Sources of food and water may simply be represented in the LoFi Environment Abstraction 120 as circular patches on the ground-plane, and so can be represented by three numbers: the (x,y) co-ordinates of the center of the patch, and its radius. Thus it can be seen that the LoFiSim representation of many thousands of antelope, many hundreds of lions, and many patches of food and many patches of water can be represented without the need for much computation-power or storage-space.

In this example it could be the case that if a lion is sufficiently close to an antelope, if the lion is hungry and if it has enough energy then it will chase the antelope. At this point the LoFiSim abstraction 120 and animat representations 30 are not sufficient to capture the details of the interaction between the two creatures. Consequently a HiFiSim representation of each animal is created, with HiFi sensors 250 and HiFi actuators 260 interacting with the HiFi Environment Implementation 220.

For greater accuracy and realism, the HiFi Environment 220 may involve a 3-d model of the animals' environment, including representations of natural terrain features such as hills and trees and rivers that form potential obstacles or impediments. The HiFi Sensor Physics 221 may use 3D graphics techniques to model directional vision in each HiFi animat, in which case the Sensor HiFi Implementation would have to model the "retina" of each animat as an array of pixels with appropriate modeling of the animal's optics (field of view, acuity of vision, etc). Similarly the HiFi Actuator Physics 222 may use advanced mathematical modeling of Newtonian kinematics and dynamics such as those known in the prior art "physics engine" commercial middleware software products "Mathengine" (found at mathengine.com) and "Havok" (found at havok.com), in which case the Actuators HiFi Implementation 260 would represent the animal's body skeletal frame and musculature in a manner consistent with the physics engine chosen for the HiFi Actuator Physics 222.

It will be appreciated that the HiFi Actuator Physics 222 and the HiFi Sensor Physics 221 are more tightly coupled within the HiFi Environment Implementation 220 than are the corresponding aspects of the LoFi Environment Abstraction 120. Consider (for example) that what the creature senses using vision is affected by the current orientation of the creature's eyes and head, which is in turn determined by the actions of the creature's gaze-actuators (eyeball and neck muscles). It is typically necessary to represent such sensory-motor coupling in High fidelity simulations but it can be abstracted away from in low Fidelity representations.

It will furthermore be appreciated that the coupling of 221 and 222 within 220 can extend to the creature's "sensation of self", e.g. modeling an animal's interception (e.g. sensation of pain/damage, satiation, etc) or the analogous monitoring functions in machines (e.g. monitors/sensors of oil-levels, engine temperatures, tyre pressures, etc).

In the example being described here, the HiFi Animat instances of the chasing lion and the chased antelope will clearly require comparatively large amounts of data-storage space and computer-processor calculations to resolve the outcome of the interaction (i.e. whether the antelope escapes or not). By only creating these HiFi Sim representations when they are needed, and destroying them as soon as they are no longer needed, it is possible to give the impression of highly complex high-fidelity simulations of many thousands of creatures while using a computer processor and memory storage system that is actually capable of accurately computing and storing such high-fidelity simulations for only a very small number of such simulated creatures. The HiFiSim Animat representations 40 are only created when necessary, and are only maintained for as long as is necessary. So long as only a few animats are interacting with their environments (and the other animats) in ways requiring accurate and complex computations, the remainder of the creatures in the simulation can be satisfactorily represented using the LoFiSim Animat representation 30.

The LoFi Animat Representation 30 can be seen to include the High Level Brain or HLB 70 which is responsible for selecting particular behavioral states or modes of action (such as resting, sleeping, exploring, or eating). The transitions between these states are caused by changes in the creature's Internal State 90 (such as energy levels altering) and by changing the abstract sense-data provided by the LoFi Sensors Abstraction 150.

The HiFi Animat Representation 40 includes the HLB 70 and Internal State values 90 but additionally includes a Low Level Brain or LLB 80 which implements specific behaviours at the level of triggering actuators in a fashion appropriate for each behavior. The actions of the LLB can be affected or modulated by the Internal State values 90 and by sensory information received from the Sensors HiFi Implementation 250. The actions of the HLB 70 can also affect the LLB 80. In each instance of the HiFi Animat Representation, the HLB may be affected by the Abstract LoFi sensory data coming from 150, but in this case the data source for 150 is the HiFi to LoFi converter 100.

Thus it can be appreciated that in this embodiment the Sensors LoFi Abstraction 150 and the HLB 70 are used in both the LoFi and HiFi complexity-levels of the simulation, while other components are specific solely to either the LoFi or the HiFi complexity-levels.

In the preferred embodiment, the HLB 70 is a simple stochastic action selection mechanism used in both the Hi-Fi Sim and the Lo-Fi Sim. The underlying mechanism is a Markov net, a finite-state process where the different states represent different behavioral modes or activities. The probability of transitions from one state to another are dependent on the animat's internal state variables (i.e. simulated biochemical and energetic levels e.g. indicating the energy level or level of fear of the creature) and any sensory input it receives.

Figure 2:
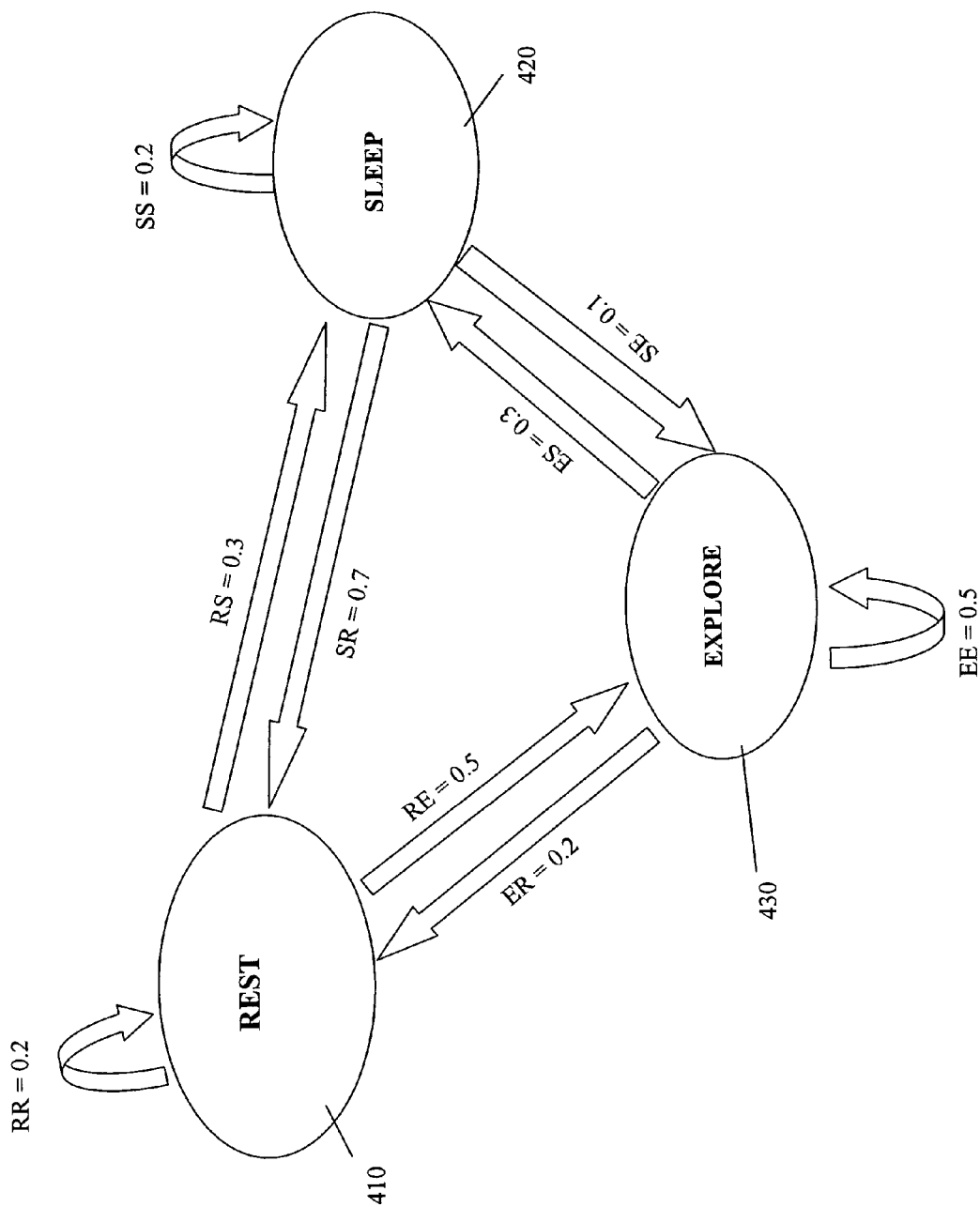
FIG. 2 illustrates the different modes and associated transition probabilities between the modes of a high level brain, according to the preferred embodiment of the present invention.

FIG. 2 shows a state machine representing three possible states (rest 410, sleep 420 and explore 430) that are used in a simplistic behavior selection mechanism of an artificial creature.

The arrows joining each of the states represent the probability of the transition between each state e.g. RS=0.3 indicates that the probability of the creature moving from the rest state to the sleep state is 0.3 for any given time interval, RE=0.5 indicates that the probability of the creature moving from the rest to the explore state is 0.5 in the same time interval, and RR=0.2 indicates that the probability of the creature remaining in the rest state is 0.2 in the same time interval.

At any one time, it is assumed that the creature is only ever in one of the possible states. Consequently, whenever the behavior is reevaluated, only the probability of the behavior changing from that state (either back to the same state, or to another valid state) is evaluated. The value of the probability of a transition from any given state (and either back to the same state or to another state) is between 0 and 1, with a value of 0 meaning there is no chance of transitioning between the specified states, and an output of 1 meaning that this is the only transition that is possible. Clearly, the sum of all of the transition probabilities from a given state is always equal to 1.

In this preferred embodiment, the creature perceives its environment via sensors. Preferably, such sensors can identify information about the environment (which may be a simulated real or imaginary physical environment). The sensors detect, for example, the number of visible objects, location, object type etc, with processing occurring so as to determine whether the sensed items are likely to affect the behavior of the creature (has food been sensed?, a rival?, a potential mate?).

Additionally, the creature has other inputs, corresponding to internal drives, such as hunger, fatigue, thirst and desire to reproduce.

The transition probability between each behavioral state is not fixed but is instead a function dependent upon factors such as sensory input, internal drives and the temperament of the creature.

The transition probability values shown in FIG. 2 are provided by way of example only, and would in fact vary over time depending upon these other factors.

It will be appreciated that the above embodiment is provided by way of example only, and that various other embodiments will be apparent to the skilled person. For instance, an embodiment of the invention might not be applied to all of the creatures within a simulation, but to only a portion of the creatures.

It will be appreciated that the simple state-transition network described here is only one possible embodiment of the HLB behavior-selection mechanism, and other methods could be used instead. Examples of other methods include those described by:

T. Tyrrell. *Computational Methods of Action Selection.* PhD Thesis, University of Edinburgh 1993.

B. Blumberg. Old Tricks, New Dogs: Ethology and Interactive Creatures. PhD Thesis, Massachusetts Institute of Technology, 1997.

In addition to this, it can be appreciated that aspects of the approach described here in respect of simulation of creatures can be employed more generally to simulation. In particular, other situations may be considered in which a simulation may be split into a first part which defines states and the possible transitions between states—a state machine—and two or more alternative second parts which are adapted to implement these transitions at different levels of complexity.

Figure 3A:
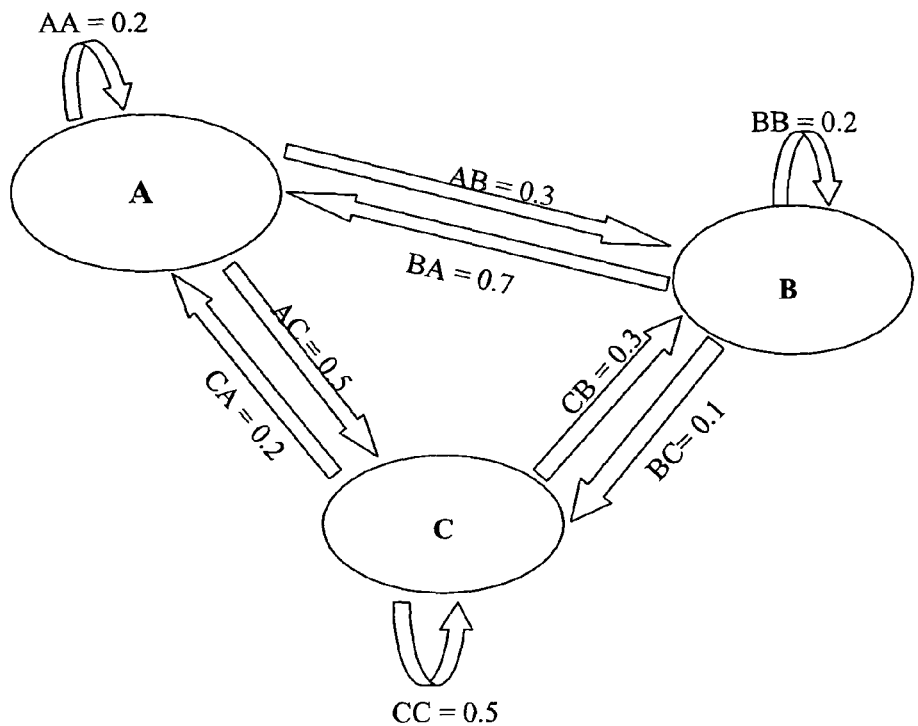
FIGS. 3A and 3B illustrate the generic application of aspects of the invention to simulation.
Figure 3B:
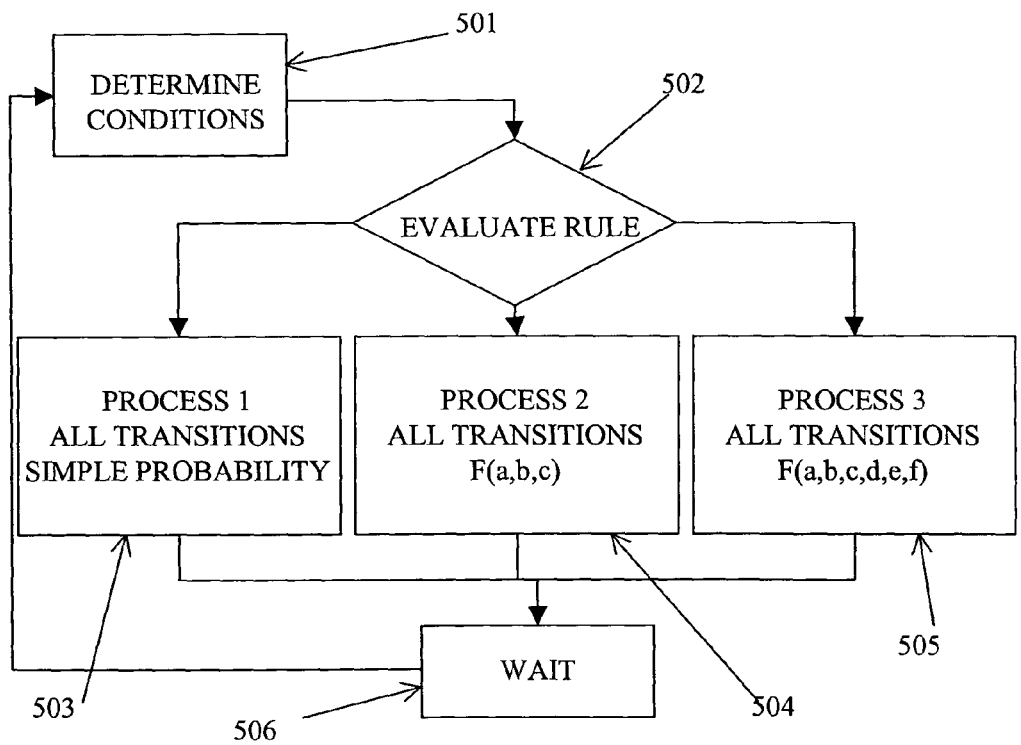

A general "first part" is shown in FIG. 3A, and closely resembles the state machine of FIG. 2. Three states are shown (A, B and C), together with possible transitions between them, and (in this case), probabilities for each transition. The general "second part", or collection of second parts, is shown in FIG. 3B. It is desirable first to have a rule evaluated 502 with reference to at least one condition determined 501 by the computational system. This may be, for example, processor time available to carry out the simulation or predicted to be available over a certain period. This may apply where the simulation is a single simulation rather than one of a group, and that the constraint on the simulation is that it must be carried out within a fixed period of time despite having varying computational resources available. The condition may also be an indication of the significance of the simulation (rather as in the case of animats—there may be some determination as to which simulated entities are important, or important at that time, and computational resources may be preferentially allocated to such entities—note here, however, that the "simulated entities" may be simply processes rather than specifically creatures).

On the basis of the evaluation of the rule, alternative second portion choices 503, 504, 505 are followed for evaluating each of the transitions in FIG. 3A (as is shown here, there may be more than two alternative levels of complexity available, rather than simply two). Each of these second choices has the same set of transitions, but different rules or methods for implementing these rules such that the choices are of different levels of computational complexity. Here, for example, choice 503 simply provides transition probabilities to be evaluated over a particular period of time. Choice 504 involves further variables a, b and c in calculating transitions—this will be of greater computational complexity than for choice 503, but will, preferably, be such that choice 503 provides an approximation to the process of choice 504 (so that both can reasonably be regarded as implementations of the first portion shown in FIG. 3A). Choice 505 involves further variables d, e and f, and is thus presumed for this example only to be of still greater computational complexity—though it is appreciated that the presence of additional variables will not necessarily result in computational complexity, and that this may also result from other causes (such as functions that are more complex to evaluate). These different choices are used for simulation—FIG. 3B shows a loop structure with periodic re-evaluation of the rule 502 after a waiting step 506 (suggesting that the simulation can change levels of complexity during the process—which may be desirable if, for example, the computational resources available vary), but in other cases the simulation may simply continue until an end condition is reached.

As will be appreciated from the above, such an approach to simulation is not limited in its application to large-scale simulation of multiple creatures. The approach can be applied to simulations of single creatures, entities or even processes with different levels of computational resource available, or may be applied to simulations of plural entities or processes.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiments(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of simulating a creature for use in two different complexities of simulation, the method comprising:
  utilizing a model of the creature that comprises at least two portions:
    a first portion which contains functions for use in both of said different complexities of simulation; and
    a second portion comprising two alternative versions:
      a first version for use in one of said different complexities of simulation, wherein the first version utilizes a neural network; and
      a second version for use in the other of said different complexities of simulation, wherein said first portion comprises a behavior selection mechanism arranged to select the behavior of said creature and said second portion is arranged to execute the selected behavior.

2. A method as claimed in claim 1, wherein said behavior selection mechanism is arranged to select the behavior based upon at least one of:
the current behavioral state;
one or more internal state variables of the creature;
the environment surrounding the creature; and
one or more sensory inputs to said creature.

3. A method as claimed in claim 1, wherein said behavior selection mechanism consists of a set of mutually exclusive behavioral states.

4. A method as claimed in claim 1, wherein the second version is for use in a less complex of the simulations, and is arranged to approximate functionality of the first version.

5. A method as claimed in claim 1, wherein the first version utilizes a three dimensional physical simulation of an animat, and the second version utilizes a parameterized model of the animat to approximate movement.

6. A method of simulating activities of a plurality of creatures, the method comprising utilizing at least two modes of simulation:
a first mode arranged to simulate the activities of all of said creatures; and
a second mode arranged to simulate an activity of at least one of said creatures at a more detailed computational level of complexity than said first mode, wherein a model of a creature simulated in both modes of simulation comprises at least two portions:
a first portion which contains functions arranged for use in both of said first, second modes of simulation; and
a second portion comprising two alternative versions, a first version for use in said first mode of simulation, and a second version for use in the second mode when selected for closer inspection of the at least one creature being simulated.

7. A method of simulating a process at two different levels of complexity, the method comprising:
utilizing a model that comprises at least two portions:
a first portion which contains functions for use in both of said two different complexities of simulation; and
a second portion comprising two alternative versions:
a first version for use in one of said two different levels of complexities of simulation when selected for closer inspection of the process being simulated; and
a second version for use in the other of said different levels of complexities of simulation, wherein the second version is for use in a less complex level of the simulations, and is arranged to approximate functionality of the first version.

8. A method as claimed in claim 7, further comprising evaluating one or more conditions to determine a result of a rule for selecting which of the two alternative versions of the second portion to use in simulating the process.

9. A method as claimed in claim 7, wherein the first version utilizes a neural network.

10. A simulator device arranged to simulate a creature in two different levels of complexities of simulation, the simulator device being arranged to utilise a model of the creature that comprises at least two portions:
a first portion which contains functions used in both of said two different levels of complexities of simulation; and
a second portion comprising two alternative versions, a first version used in one of said two different levers of complexities of simulation when selected for closer inspection of the process being simulated, and second version used in the other of said different levels of complexities of simulation; wherein the second version is for use in a less complex of the simulations, and is arranged to approximate functionality of the first version.

\* \* \* \* \*